United States Patent [19]

Tellman

[11] 4,109,041

[45] Aug. 22, 1978

[54] CONSTRUCTION PANEL WITH NON-SKID SURFACE AND METHOD OF FABRICATION

[75] Inventor: Stephen J. Tellman, Patterson, N.Y.

[73] Assignee: Champion International Corporation, Stamford, Conn.

[21] Appl. No.: 848,485

[22] Filed: Nov. 4, 1977

Related U.S. Application Data

[63] Continuation of Ser. No. 708,306, Jul. 26, 1976, abandoned, which is a continuation-in-part of Ser. No. 627,346, Oct. 30, 1975, which is a continuation of Ser. No. 488,709, Mar. 6, 1974, abandoned.

[51] Int. Cl.$^2$ ............................................... B32B 5/16
[52] U.S. Cl. .................................. 428/147; 156/62.2; 156/279; 156/280; 428/143; 428/327; 428/334; 428/342; 428/496; 428/521; 427/180; 427/202
[58] Field of Search ............... 428/327, 326, 143, 147, 428/206, 342, 511, 512, 496, 334, 402, 521; 156/62.2, 279, 280; 427/202, 180; 52/181; 264/122, 112, 113; 16/1

[56] References Cited

U.S. PATENT DOCUMENTS

| | | | |
|---|---|---|---|
| 1,968,809 | 8/1934 | Curtis | 428/147 |
| 2,298,664 | 10/1942 | Van Patter | 428/143 |
| 2,686,143 | 8/1954 | Fahrni | 156/62.8 |
| 2,793,136 | 5/1957 | Root | 428/147 |
| 3,030,251 | 4/1962 | La Bore | 428/323 |
| 3,227,604 | 1/1966 | Morgan | 428/331 |
| 3,267,187 | 8/1966 | Slosberg | 428/143 |
| 3,272,098 | 9/1966 | Buchholtz | 404/32 |

FOREIGN PATENT DOCUMENTS

| | | | |
|---|---|---|---|
| 1,006,294 | 9/1965 | United Kingdom | 428/323 |
| 1,017,654 | 1/1966 | United Kingdom | 428/323 |

*Primary Examiner*—Ellis Robinson
*Attorney, Agent, or Firm*—Evelyn M. Sommer

[57] ABSTRACT

Elastomeric particles, e.g., rubber grindings and buffings produced in vehicular tire manufacturing and recapping operations, are incorporated into at least one surface of particle-board panel to increase friction, prevent stacked panels from sliding in echelon, prevent tools from sliding thereon, prevent workmen from slipping thereon, and still allow the panel to be cut and nailed. The particles can be bonded to the panels simultaneously with the panel molding operation or in a separate subsequent operation. In a preferred method of fabricating a non-skid construction panel of the subject invention, rubber particles in the range from below about 10 to above about 20 pounds per one thousand square feet of surface area are distributed over a panel, and the rubber particles and the panels are subsequently subjected to heat and pressure, and the resulting panel has a smooth surface with the elastomeric particles being used somewhat as a light "salting" of the construction panel's surface layer. The resulting layer is smooth, but the presence of the elastomeric particles insures the non-slipping features mentioned above, as well as the ability of the panel to be nailed and cut, as required.

14 Claims, 5 Drawing Figures

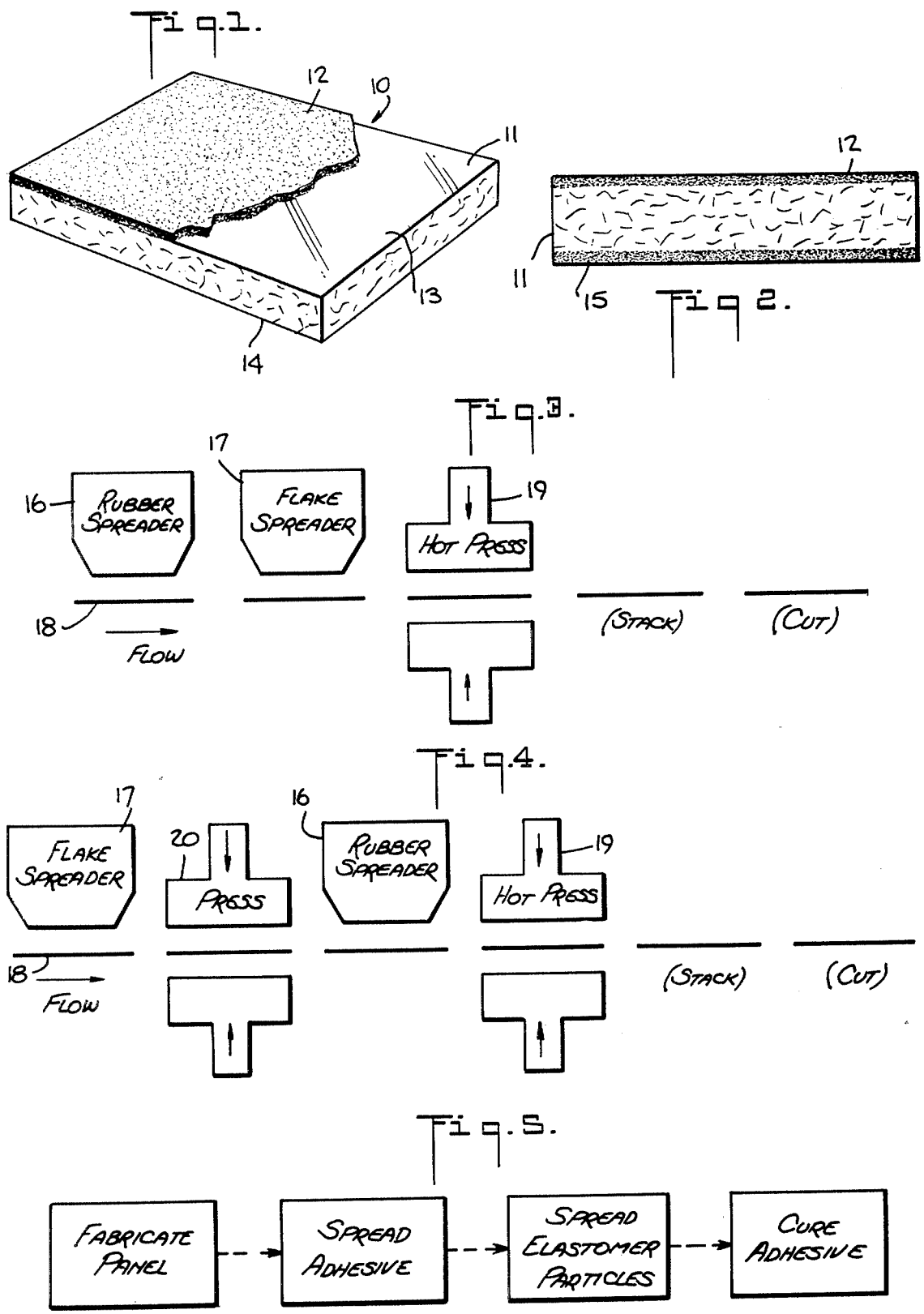

CONSTRUCTION PANEL WITH NON-SKID SURFACE AND METHOD OF FABRICATION

The subject application is a continuation of U.S. patent application Ser. No. 708,306, filed July 26, 1976 now abandoned, which in turn is a continuation-in-part of U.S. patent application Ser. No. 627,346 filed Oct. 30, 1975 which, in turn, is a continuation of application Ser. No. 488,709 filed Mar. 6, 1974, now abandoned.

The present invention relates to construction panels, and more particularly to construction panels or sheathing normally having extremely smooth surfaces.

Plywood, particleboard, hardboard and fiberboard are well known panel materials along with metal and plastic. These materials are used individually and in various combinations. In most instances the panels are produced with smooth surfaces. Particleboard, for example, is formed by a molding operation usually from a flake-type filler material and a binder resin. A typical panel is produced by mixing wood chips or shavings with a phenolic resin and curing the resin under the influence of heat and pressure to produce a smooth surfaced structural sheet.

Particleboard and hardboard can be produced more economically than plywood and have been used as a substitute for the latter in building construction. It is particularly useful as the sub-sheathing in roofing, siding and flooring. Unfortunately, particleboard has an extremely smooth or slick surface which provides poor footing to workmen who have been found to slip and fall thereon, particularly when said material is wet or dusted with sawdust or the like.

Furthermore, when said particleboard panels are employed as roof sheathing on pitched roofs, it has proven difficult to loosely stack panels on such incline without the stacks slipping and falling. Furthermore, tools skid along the surface and are difficult to maintain in place.

Various attempts have been made to increase the surface friction of particleboard or hardboard panels but, while various methods of roughening the surface such as by sanding or embossing improve underfooting for the workmen, they do not appear to afford appreciable improvement for preventing tools from slipping thereover or stacked panels from sliding in echelon.

As mentioned above, one of the attractive features of particleboard and hardboard is its relatively low cost compared to comparable construction materials such as plywood or the like. However, such economic advantage while significant is not appreciable. Therefore, any technique for remedying the problem caused by the slippery surface must not add significantly to the cost of such panels.

With the foregoing in mind, the present invention provides an economical solution to the problem utilizing an otherwise scrap material in a particular manner by a simple addition to the existing production line. In particular, the invention can be practiced by using rubber grindings and buffings produced as a waste product in vehicular tire recapping operations. Of course, as will appear hereinafter, any particulate elastomeric material may be employed satisfactorily. However, the aforesaid grinding and buffing waste is presently believed to afford the best economy.

In accordance with one aspect of the present invention there is provided an improved construction panel comprising a layer of elastomeric particles distributed over and bonded to at least one external surface of a structural sheet of material selected from the group consisting of particleboard, hardboard, plywood, fiberboard, and combinations thereof.

In accordance with a further aspect of the subject invention, there is provided the method of producing a particleboard panel which comprises the steps of distributing elastomeric particles on a caul plate, depositing wood flakes admixed with a binder over said particles to form a composite mat, and curing said binder to simultaneously form said particleboard panel while bonding said elastomeric particles to a surface thereof.

Finally, the subject invention provides a method of inhibiting normally slippery-surfaced construction panels from sliding in echelon when stacked which method comprises providing at least one external surface of each of said panels with an adherent layer of distributed elastomeric particles.

The invention will be better understood after reading the following detailed description of the presently preferred embodiments thereof with reference to the appended drawings in which:

FIG. 1 is a perspective view of a construction panel constructed in accordance with the subject invention and with the elastomeric layer partially broken away;

FIG. 2 is a cross-sectional view of a construction panel showing a modification of the subject invention;

FIG. 3 is a flow diagram illustrating a typical production line for producing the subject panels in accordance with one embodiment of the invention;

FIG. 4 is a view similar to FIG. 3 showing a modification thereof; and

FIG. 5 is a flow diagram showing a further method for producing the panels embodying the invention.

Referring now to FIG. 1 of the drawings, the construction panel, designated generally by the reference numeral 10, is formed with a substrate 11 of particleboard construction having its upper surface covered with a layer 12 of elastomeric particles bonded thereto. In the absence of layer 12, the particleboard layer 11 would have an extremely smooth surface as shown in the region 13 where the layer 12 is shown cut away. It will be understood that the underside 14 of the panel 10 is untreated and, therefore, similarly smooth. Alternatively, as shown in FIG. 2, both surfaces of the panel 11 may be provided with elastomeric layers. These are shown at 12 and 15.

The presently preferred method for producing the panel illustrated in FIG. 1 is shown diagrammatically in FIG. 3 to which attention should now be directed. A spreader 16 for rubber particles is added to the production line immediately preceding a flake spreader 17 to deposit a distributed layer of rubber or elastomeric particles on the usual caul plate 18. Tire rubber is particularly well suited for this application for several reasons. It has good resistance to high temperatures, adequate bondability to particleboard using particleboard adhesives, is resilient, non-abrasive, tough, durable and non-toxic. It is a waste product produced in the grinding and buffing operations of tire recapping and quite inexpensive. The grinding and buffing waste from the vehicular tires employed in the subject process generally has a relatively small particle size, and more particularly of a thickness less than 4 mils, as more particularly set forth below.

After the rubber particles are spread on the caul plate they are covered by the flake spreader 17 with a suitable layer of filler material mixed with a binder resin. In the presently preferred embodiment wood flakes mixed with a phenolic resin is employed. Other cellulosic filler materials and resins may be used as desired.

At the third station the mat produced by depositing the rubber, wood flakes and binder on the caul plate is introduced between the platens of a heated molding press 19 and the resin is cured through the application of heat and pressure. Typical operating temperatures are in the range of 280° to 415° F., while operating pressures may vary from 150 to 400 psi and the time interval from 4 to 20 minutes. The specific parameters will be dictated by those normally applicable to the fabrication of the particleboard or hardboard without the addition of the rubber particles. It has been found that the molding operation not only forms the particleboard, but bonds the elastomeric particles to the surface thereof. To insure adequate adhesion of the elastomeric particles, it is generally necessary that additional adhesive be added thereto. In certain cases, however, sufficient resin binder may be available admixed with the wood flakes to cause adequate adherence of the rubber particles. With respect to the quantity of elastomeric particles employed in the subject invention, satisfactory results have been obtained experimentally with application rates ranging from below about 10 to above about 20 lbs. per 1,000 sq. ft. of surface area. Best results appear to be obtained with the higher loading. In a specific experimental test, as more fully set forth hereinafter, 8 to 10 grams of the vehicular tire grinding and buffing waste is distributed over each square foot of a panel, which results in a quantity that is equivalent at the upper limit to slightly over 22 lbs. per 1,000 sq. ft. of resulting panel. The average quantity for 9 grams per square feet is equivalent to approximately 20 lbs. per 1,000 sq. ft. By this arrangement only approximately 10% of the resulting surface area of the panel contains exposed rubber, while the remainder of the surface is particleboard. Bearing in mind that the average density of commercial soft rubber is only about 69 lbs. per cubic feet, it is found that a continuous homogeneous layer of rubber having the maximum concentration of 22 lbs. per 1,000 sq. ft. would only have a thickness of less than 4 mils. Since the average particles are slightly greater than 4 mils in diameter, they are spread apart and thus can be viewed somewhat as light "salting" of the surface layer. Accordingly, the resulting panel has a smooth surface. In the subject process, the rubber particles are subjected to heat and pressure during the in situe procedure. The high temperature rubber of the type used in vehicular tires is capable of withstanding the normal high temperature encountered in molding particleboard material, and as more specifically set forth above, said operating temperatures are in the range of 280° to 480° F. The rubber is capable of withstanding such temperature, and accordingly can be employed in the subject process.

After forming in hot press 19, the sheets or panels, in conventional manner, may be stacked and thereafter cut into standard sizes, or otherwise processed.

Referring now to FIG. 4 an alternative procedure is illustrated for fabricating the subject panels. The flake spreader 17 is now located at the head of the production line followed by a press 20 for prepressing the flake-binder mat in order to produce a united upper surface to receive the layer of rubber particles at the third station from the rubber spreader 16. The particleboard mat with the rubber particles on its upper surface is now placed in the conventional hot press 19 for curing the resin, forming the particleboard substrate and simultaneously bonding the elastomeric or rubber particles to its upper surface. The exiting panels are stacked and then cut to conventional size.

As a further modification, a second rubber spreader (not shown) may be added in front of the flake spreader 17 in the production line of FIG. 4 in order to produce a panel having an elastomeric coating on both surfaces thereof. In essence, this represents a combination of the procedures outlined in FIGS. 3 and 4.

A still further method for producing a panel with a non-skid surface of adherent elastomeric particles is outlined by the flow diagram in FIG. 5. As indicated therein a construction panel of suitable material is first produced. If a composition board, it would be completely cured. One surface is then spread with a suitable compatible adhesive after which elastomeric particles are distributed thereover. Thereupon the adhesive is allowed to dry or otherwise cure in order to bond the elastomeric particles to the surface of the panel. If desired, the other surface of the panel may be similarly treated.

In order to afford some indication of the relative improvement obtained through the use of the present invention, a series of tests were run and data collected to demonstrate slide resistance of a particular panel material over another panel simulating the conditions that would be encountered if one, five or 10 panels were placed in a stack on various inclines. The tests were performed by producing a 4-inch square of the material to be tested and placing it on a second square of either the same or different material then slowly tilting the stack to an angle at which the upper square began to slide over the lower square. Weights were attached to the upper square to simulate the weight of five or ten panels. The lower square was gently tapped during the test to simulate vibrations that might be encountered under actual field conditions on a construction site. The results of the tests are shown in the following table in which the surfaces in contact are identified by the following key:

A = particleboard. B = plywood.
C = particleboard sanded (40 grit).
D = "rough sawn" particleboard.
E = particleboard with embossed 174 inch mesh screen pattern.
$F_1$ = particleboard with very light and spotty dusting of fine rubber particles (~ 5gms/ft$^2$).
$F_2$ = particleboard with light but uniform dusting of fine rubber particles. (~ 5 gms/ft$^2$).
$F_3$ = particleboard with heavy coating of fine and medium size rubber particles. (~ 8–10 gms/ft$^2$).
G = particleboard with round spots of rubber particles (½ inch diameter) spaced approximately 1½ inches apart over entire surface.

The symbols ( $\parallel$ ) and ( $\perp$ ) stand, respectively, for parallel to and perpendicular to the machine or grain direction, as applicable.

| Surfaces in Contact | SLIDE RESISTANCE OF ONE PANEL MATERIAL OVER ANOTHER Min. Angle to start slide (degrees) | | |
|---|---|---|---|
| | Wt. of 1-panel | Wt. of 5-panels | Wt. of 10-panels |
| A - A | 14° | 10° | 10° |
| B - B ($\parallel$) | 30° | 27° | 27° |
| ($\perp$) | 34° | 27° | 26° |
| C - C ($\parallel$) | 36° | 24° | 26° |
| ($\perp$) | 34° | 26° | 26° |

| SLIDE RESISTANCE OF ONE PANEL MATERIAL OVER ANOTHER -continued | | | |
|---|---|---|---|
| Surfaces in Contact | Min. Angle to start slide (degrees) | | |
| | Wt. of 1-panel | Wt. of 5-panels | Wt. of 10-panels |
| A - C (//) | 21° | 16° | 15° |
| (⊥) | 24° | 17° | 17° |
| A - D (//) | 23° | 16° | 16° |
| (⊥) | 21° | 14° | 12° |
| A - E | 12° | 12° | 12° |
| A - F₁ | 33° | 28° | 23° |
| A - F₂ | 33° | 29° | 25° |
| A - F₃ | 34° | 31° | 30° |
| A - G | 31° | 28° | 28° |

From the foregoing table, it should be apparent that the application of the elastomeric layer to the particleboard increases slide resistance of the panels beyond that obtained with plywood which is used as a reference.

While the subject invention has been described with reference to the fabrication of particleboard and the treatment thereof, it will be understood that the non-skid surface afforded by the layer of elastomeric particles will be useful when applied to other construction panels such as that formed from metal, plastic, or even plywood, or combinations thereof.

After fabrication, it has been found that the rubber coated particleboard constructed in accordance with the present invention can be handled and machined in conventional manner as ordinary particleboard.

While, as observed from the above table, rough sawing and coarse sanding are effective for improving friction between panels, it is only significant when both surfaces or sides of the panel are so modified such that roughened surface contacts roughened surface. But roughing up the surface alters the appearance of the panels and there is no escaping this disadvantage. This is not true with respect to the application of elastomeric particles, however, since it is effective when applied to only one side of the panels if they are stacked with the coated surfaces all in the same direction. By coating only one side of a panel the user may use the panels in such a way as to conceal the coated side and expose the finished uncoated side. This may be desired for aesthetic reasons in certain applications where the non-skid feature is not necessary in the final construction. Yet, the non-skid feature will serve its functional purpose while the panels are stacked awaiting use. However, where the sheathing or panel will be covered by exterior material such as shingling the appearance aspect is unimportant and the panel may be used with its non-skid surface exposed to minimize the risk to the workmen who must walk upon it.

Having described the invention with reference to the presently preferred embodiments thereof, it will be understood that various changes may be made both with respect to the construction and the method therefor without departing from the true spirit of the invention as defined in the appended claims.

What is claimed is:

1. An improved construction panel comprising:
a structural sheet of material selected from the group consisting of particleboard, hardboard, plywood, fiberboard, and combinations thereof, said sheet having at least one smooth surface; and
a layer of elastomeric particles generally uniformaly distributed over and bonded to at least one smooth surface of said sheet, said particles being separated to expose a substantial part of said surface and being of a size which effectively preserves the smoothness of said surface while imparting a non-slip characteristic thereto.

2. An improved construction panel according to claim 1 wherein said elastomeric particles comprise the dust produced by grinding tire rubber.

3. The improved construction panel according to claim 1 wherein said elastomeric panels are distributed in an amount in the range of from about 10 to about 20 pounds of particles per one thousand square feet of sheet surface.

4. The improved construction panel according to claim 1 wherein said particles cover approximately 10% of the sheet surface.

5. The improved construction panel according to claim 1 wherein the layer of elastomeric particles is about 4 mils in thickness.

6. The improved construction panel according to claim 3 wherein the layer of elastomeric particles is about 4 mils in thickness.

7. The improved construction panel according to claim 4 wherein the layer of elastomeric particles is about 4 mils in thickness.

8. The method of inhibiting normally slippery surfaced construction panels from sliding in echelon when stacked which comprises providing at least one smooth surface of each of said panels with a thin adherent layer of generally uniformly-distributed elastomeric particles, said particles being separated to expose a substantial part of said surface and being distributed in an amount in the range of from about 10 to about 20 pounds of particles per one thousand square feet of panel surface.

9. The method of producing a particleboard panel comprising the steps of generally uniformly distributing elastomeric particles on a caul plate in an amount in the range of from about 10 to about 20 pounds of particles per one thousand square feet of caul plate area, said particles forming a thin layer of spaced particles, depositing wood flakes admixed with a binder over said particles to form a composite mat, and curing said binder to form said particleboard panel while bonding said elastomeric particles to the surface thereof.

10. The method of producing a particleboard panel comprising the steps of generally uniformly distributing elastomeric particles on a caul plate in an amount in the range of from about 10 to about 20 pounds of particles per one thousand square feet of caul plate area, said particles forming a thin layer of spaced particles, depositing wood flakes admixed with a binder over said particles to form a composite mat, prepressing said mat to form a surface, generally uniformly distributing elastomeric particles on the mat surface in an amount in the range from about 10 to about 20 pounds of particles per one thousand square feet of mat surface, and curing said binder to form said particleboard panel while bonding said elastomeric particles to both surfaces thereof.

11. The method according to claim 9 wherein said binder is cured by applying heat and pressure to said mat.

12. The method according to claim 10 wherein said binder is cured by applying heat and pressure to said mat.

13. The method of producing a particleboard panel comprising the steps of depositing wood flakes admixed with a binder on a caul plate to produce a mat, prepressing said mat, generally uniformly distributing elastomeric particles over a surface of the prepressed mat in an amount in the range of from about 10 to about 20 pounds of particles per one thousand square feet of mat surface, said particles forming a thin layer of spaced particles which expose a substantial part of the mat surface, and curing said binder to form said particleboard panel while bonding said elastomeric particles to the surface thereof.

14. The method according to claim 13 wherein said binder is cured by applying heat and pressure.

* * * * *